(12) United States Patent
Alculumbre

(10) Patent No.: US 8,478,995 B2
(45) Date of Patent: Jul. 2, 2013

(54) METHOD OF ENCRYPTING AND TRANSFERRING DATA BETWEEN A SENDER AND A RECEIVER USING A NETWORK

(75) Inventor: Michael H Alculumbre, London (GB)

(73) Assignee: Litera Corp., McLeansville, NC (US)

( * ) Notice: Subject to any disclaimer, the term of this patent is extended or adjusted under 35 U.S.C. 154(b) by 1787 days.

(21) Appl. No.: 11/134,951

(22) Filed: May 23, 2005

(65) Prior Publication Data

US 2006/0005018 A1    Jan. 5, 2006

(30) Foreign Application Priority Data

May 24, 2004  (GB) .................................. 0411560.6

(51) Int. Cl.
H04L 29/06 (2006.01)
H04L 9/32 (2006.01)
H04L 9/08 (2006.01)

(52) U.S. Cl.
USPC ........... 713/165; 713/150; 713/152; 713/155; 713/156; 713/168; 713/182; 380/280; 380/282; 705/75

(58) Field of Classification Search
USPC ................. 713/150, 152, 165, 155, 156, 168, 713/182; 380/280, 282; 705/75
See application file for complete search history.

(56) References Cited

U.S. PATENT DOCUMENTS

| 5,757,907 A | 5/1998 | Cooper et al. ..................... 380/4 |
| 6,158,003 A * | 12/2000 | Kara .............................. 713/168 |
| 6,813,358 B1 * | 11/2004 | Di Crescenzo et al. ........ 380/280 |
| 6,904,521 B1 * | 6/2005 | Jivsov .......................... 713/155 |
| 7,136,840 B2 * | 11/2006 | Pinkas et al. ..................... 705/75 |
| 7,146,009 B2 * | 12/2006 | Andivahis et al. ............ 380/277 |
| 7,239,704 B1 | 7/2007 | Maillard et al. |

(Continued)

FOREIGN PATENT DOCUMENTS

| EP | 0 869 652 A3 | 10/2002 |
| EP | 1 307 000 A1 | 5/2003 |

(Continued)

OTHER PUBLICATIONS

Communication issued in Co-Pending Canadian Application No. 2,569,761, dated Sep. 5, 2012 (2 pages).

Primary Examiner — Edan Orgad
Assistant Examiner — Kari Schmidt
(74) Attorney, Agent, or Firm — Finnegan, Henderson, Farabow, Garrett & Dunner L.L.P.

(57) ABSTRACT

A method of encrypting and transferring data between a sender and a receiver using a network thereby transferring data in a secure manner includes the steps of a server receiving from the sender an identifier of the receiver; generating a transfer specific encryption key specific to the transfer; encrypting the data using the generated transfer specific encryption key; the server retrieving information specific to the receiver that is accessed according to the identifier of the receiver received from the sender, and using the retrieved information specific to the receiver to encrypt the transfer specific encryption key; transferring the encrypted data and the encrypted transfer specific encryption key over the network for receipt by the receiver; the server receiving from the receiver the encrypted transfer specific encryption key and identifier of the receiver; the server retrieving information specific to the receiver that is accessed according to the identifier of the receiver received from the receiver, and using the retrieved information specific to the receiver to decrypt the encrypted transfer specific encryption key; and decrypting the encrypted data using the decrypted transfer specific encryption key.

27 Claims, 4 Drawing Sheets

U.S. PATENT DOCUMENTS

| | | |
|---|---|---|
| 2002/0025046 A1 | 2/2002 | Lin .................. 380/282 |
| 2002/0152378 A1* | 10/2002 | Wallace et al. ............ 713/168 |
| 2003/0046533 A1 | 3/2003 | Olkin et al. ............. 713/152 |
| 2003/0172262 A1 | 9/2003 | Curry .................. 713/156 |
| 2003/0188161 A1* | 10/2003 | Ndiaye ................ 713/168 |
| 2003/0237005 A1* | 12/2003 | Bar-Or et al. ............ 713/201 |
| 2004/0158533 A1* | 8/2004 | Messick et al. ........... 705/75 |
| 2004/0236953 A1* | 11/2004 | Merenne et al. ........... 713/182 |
| 2005/0273592 A1* | 12/2005 | Pryor et al. ............. 713/150 |
| 2006/0153380 A1 | 7/2006 | Gertner |
| 2006/0161969 A1 | 7/2006 | Moreillon |

FOREIGN PATENT DOCUMENTS

| | | |
|---|---|---|
| EP | 1 528 455 A1 | 5/2005 |
| RU | 2225681 C2 | 3/2004 |
| RU | 2006 100274 A | 8/2006 |
| WO | WO 99/41907 A1 | 8/1999 |
| WO | WO 00/20950 A1 | 4/2000 |
| WO | WO 01/69843 A2 | 9/2001 |
| WO | WO 01/78491 A2 | 10/2001 |
| WO | WO 03/073272 A1 | 9/2003 |
| WO | WO 03/079634 A1 | 9/2003 |
| WO | WO 03/107583 A1 | 12/2003 |
| WO | WO 2004/023331 A1 | 3/2004 |
| WO | WO 2004/036452 A2 | 4/2004 |
| WO | WO 2004/104747 A2 | 12/2004 |
| WO | WO 2004/104801 A2 | 12/2004 |
| WO | WO 2005/006706 A1 | 1/2005 |
| WO | WO 2005/045702 A2 | 5/2005 |

* cited by examiner

METHOD OF ENCRYPTING AND TRANSFERRING DATA BETWEEN A SENDER AND A RECEIVER USING A NETWORK

FIELD OF THE INVENTION

The present invention relates to a method of encrypting and transferring data between a sender and a receiver using a network thereby resulting in transfer of data in a secure manner.

DESCRIPTION OF THE RELATED ART

In the present day sensitive data is increasingly sent in electronic form from a sender to a receiver. In such circumstances, it has become more and more important to ensure that the data can not be intercepted or read by unauthorized people, that is to say, the data must be transferred in a secure manner so that the content of the data can only be accessed by the sender and the receiver.

In one case, a secure connection link can be set up between a sender A and a receiver B before transfer of the data occurs. However, in situations where say 10 individual people in one office wish to communicate with and transfer sensitive data amongst themselves and to 10 people in another remote office in a two-way manner, there are the disadvantages that making arrangements for so many secure connection links requires additional hardware and software. In addition, there are considerable hardware and time resources involved in maintaining such links and their associated password systems. This is especially true when the people in each office are connected together by some form of Intranet or Ethernet and the offices communication over the Internet. It is also necessary to have complex encryption and decryption software at both the sender and receiver, which requires additional hardware and software systems, and the associated specialist maintenance costs.

In another case, a single sender may wish to transfer differing data to a plurality of discrete receivers. However, this has the same disadvantages to those mentioned above. In particular, it is necessary for the sender to set up complex security provisions to keep the password systems secure. Moreover, additional hardware and software systems must be set up to store and maintain such systems.

Indeed, in an age of small handheld devices, such as personal digital assistants, mobile phones with Internet access and e-mail capability, which have limited memory and processing capacity, it is often not technically practicable to have the facility for two-way secure connections where high levels of encryption and decryption are involved.

Whilst digital certificates can be used to reduce the demand on technical resources for both the server and receiver, they involve a cost that can often not be justified to the receiver, even when this cost is small.

An alternative is for a sender to encrypt the data to be transferred and then to send the encrypted data over a network. However, once again, the receiver must have hardware processing resources available together with memory for the relevant software to enable decryption of the encrypted data. Moreover, in situations where the device of the receiver has relatively poor hardware resources, taking up valuable resources to enable secure transfer of data is often not practicable.

The use of complex encryption and decryption techniques requires the installation of special software on the sender's apparatus and the receiver's apparatus. This is both inconvenient and costly. Moreover, the installation procedure can be complex and time consuming, and can cause conflicts with other software on their respective apparatus. Furthermore, the additional software can require a level of processing power that is unavailable in the apparatus and can take up valuable memory space; this is particularly true in the case of the aforesaid hand held devices.

It is clear from the above that known methods and systems for the transfer of data in a secure manner require considerable setting up, as well as significant computer processing and local memory resources. This is clearly inappropriate to those situations where the sender and/or the receiver has apparatus with only a limited amount of the aforesaid technical resources.

There is therefore a need for a method and system to transfer data in a secure manner that can reduce the level of technical resources required by the sender and/or receivers apparatus. Also, in the case that public/private key encryption is used, the sender must be confident that the public key which they believe belongs to the receiver has not been replaced by the public key of an interloper.

BRIEF SUMMARY OF THE INVENTION

According to one aspect of the present invention there is provided a method of encrypting and transferring data between a sender and a receiver using a network, the method comprising the steps of:

a server receiving from the sender an identifier of the receiver;

establishing a transfer specific encryption key specific to the transfer;

encrypting the data using the transfer specific encryption key;

the server accessing receiver specific information according to the received identifier of the receiver and encrypting, with the receiver specific information, said transfer specific encryption key;

transferring the encrypted data and the encrypted transfer specific encryption key over the network for receipt by the receiver;

the server receiving from the receiver the encrypted transfer specific encryption key;

the server accessing the receiver specific information to decrypt the encrypted transfer specific encryption key; and decrypting the encrypted data using the decrypted transfer specific encryption key.

Preferably, the method further comprises establishing a communication link between the sender and the server and sending said identifier of the receiver to the server.

In one embodiment, the method further comprises establishing the communication link between the sender and the server to be a secure link.

In one case, the method further comprises establishing the communication link between the sender and server subject to a check by the server of a password of the sender.

In another embodiment, the method further comprises establishing a communication link between the receiver and the server and sending said identifier of the receiver to the server.

In one case, the method further comprises establishing the communication link between the receiver and the server to be a secure link.

In a particular case, the method further comprises establishing the communication link between the receiver and server subject to a check by the server of a password of the receiver.

Preferably, establishing the transfer specific encryption key takes place at the sender and the established transfer specific encryption key is sent to the server.

In another case, encrypting the data using the transfer specific encryption key takes place at the sender.

In a particular embodiment, the sender receives from the server the encrypted transfer specific encryption key and the sender transfers the encrypted data and the encrypted transfer specific encryption key to the receiver over the network.

In another embodiment, the receiver receives from the server the decrypted transfer specific encryption key and decrypting the encrypted data using the decrypted transfer specific encryption key takes place at the receiver.

In still another embodiment, establishing the transfer specific encryption key specific takes place at the server.

In a particular case, encrypting the data using the transfer specific encryption key takes place at the server.

In one embodiment, the server transfers the encrypted data and the encrypted transfer specific encryption key to the receiver over the network.

In another embodiment, decrypting the encrypted data using the decrypted transfer specific encryption key takes place at the server and the server transfers the decrypted data to the receiver.

Preferably, the method further comprises sending an identifier of the receiver from the sender to the server.

In another embodiment, the method further comprises sending an identifier of the receiver from the receiver to the server.

Conveniently, the method further comprises:

establishing a message authentication code (MAC) value for the data prior to encrypting;

transferring the. MAC value together with the encrypted data and the encrypted transfer specific encryption key; and establishing a MAC value for the data after decrypting and validating it against the transferred MAC value.

In one embodiment, encrypting the transfer specific encryption key uses one or more of a public key encryption method, a blowfish algorithm, secret code of server.

According to another aspect of the present invention there is provided a method of operating a server for encrypting and transferring data between a sender and a receiver using a network, the method comprising the steps of:

receiving from the sender an identifier of the receiver;

accessing receiver specific information according to the received identifier of the receiver and encrypting, with the receiver specific information, a transfer specific encryption key that is used to encrypt the data;

receiving from the receiver the encrypted transfer specific encryption key after the encrypted data and the encrypted transfer specific encryption key have been transferred over the network for receipt by the receiver accessing the receiver specific information to decrypt the encrypted transfer specific encryption key.

In one embodiment, the method of operating a server further comprises establishing in the server a transfer specific encryption key specific to the transfer.

In another embodiment, the method of operating a server further comprises receiving from the sender a transfer specific encryption key specific to the transfer;

and transferring the encrypted transfer specific encryption key to the sender.

Preferably, the method of operating a server further comprises encrypting the data in the server using the transfer specific encryption key.

In another preferred embodiment, the method of operating a server further comprises transferring the encrypted data and the encrypted transfer specific encryption key over the network for receipt by the receiver.

Preferably, the method of operating a server further comprises transferring the decrypted transfer specific encryption key to the receiver.

In another embodiment, the method of operating a server further comprises decrypting the encrypted data in the server using the decrypted transfer specific encryption key.

According to another aspect of the present invention there is provided a computer medium for a method of encrypting and transferring data between a sender and a receiver using a network, the medium including:

computer code for receiving from the sender an identifier of the receiver and establishing a transfer specific encryption key specific to the transfer;

computer code for encrypting the data using the transfer specific encryption key;

computer code for accessing receiver specific information according to the received identifier of the receiver and encrypting, with the receiver specific information, said transfer specific encryption key;

computer code for transferring the encrypted data and the encrypted transfer specific encryption key over the network for receipt by the receiver;

computer code for receiving from the receiver the encrypted transfer specific encryption key and for accessing the receiver specific information to decrypt the encrypted transfer specific encryption key; and computer code for decrypting the encrypted data using the decrypted transfer specific encryption key.

BRIEF DESCRIPTION OF THE DRAWINGS

An example of the present invention will now be described with reference to the accompanying drawings, in which.

DETAILED DESCRIPTION OF THE INVENTION

Figure 1:
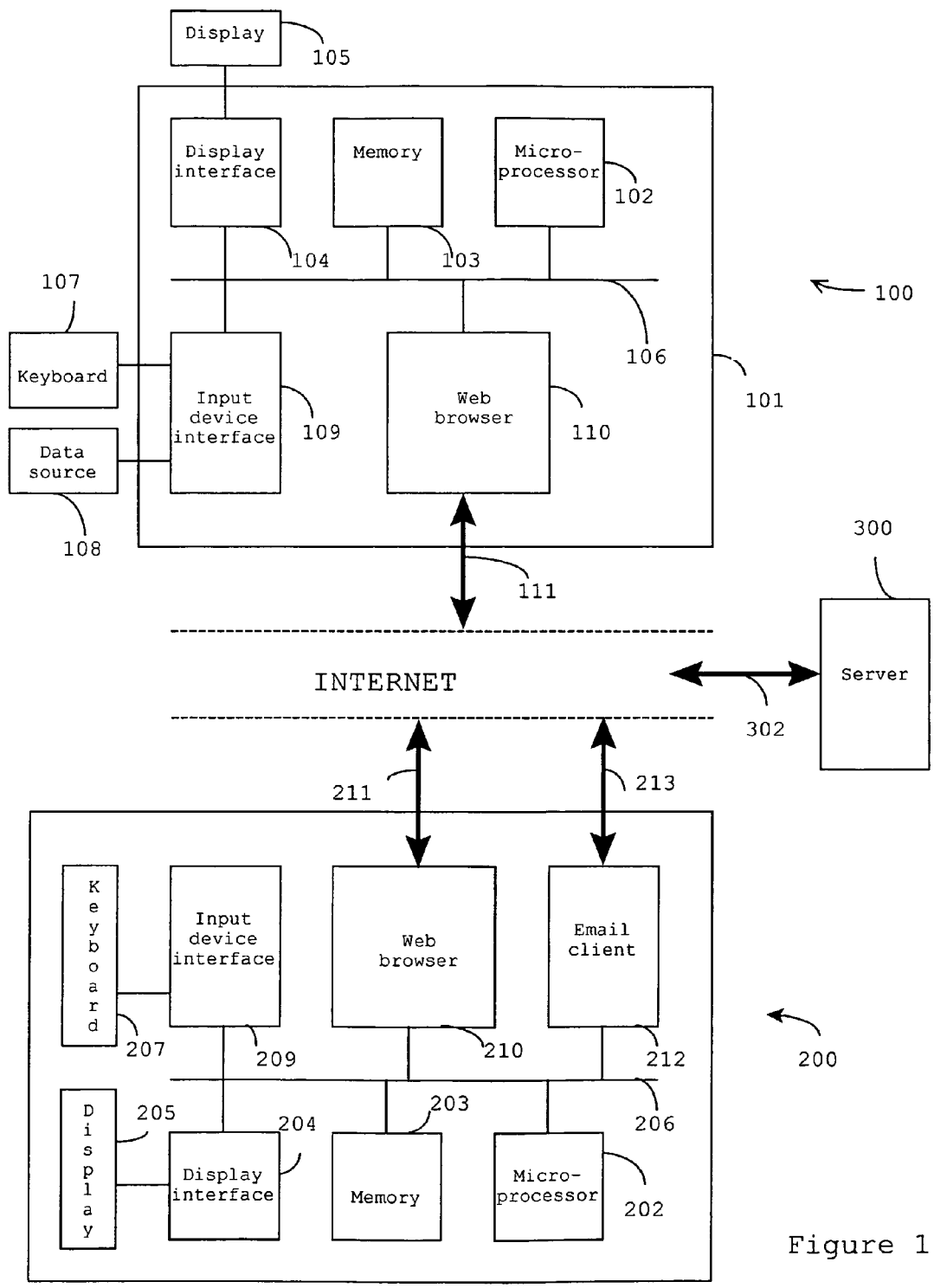
FIG. 1 shows a schematic diagram of a system operating a method of the present invention encrypting and transferring data between a sender and a receiver using a network.
Figure 2:
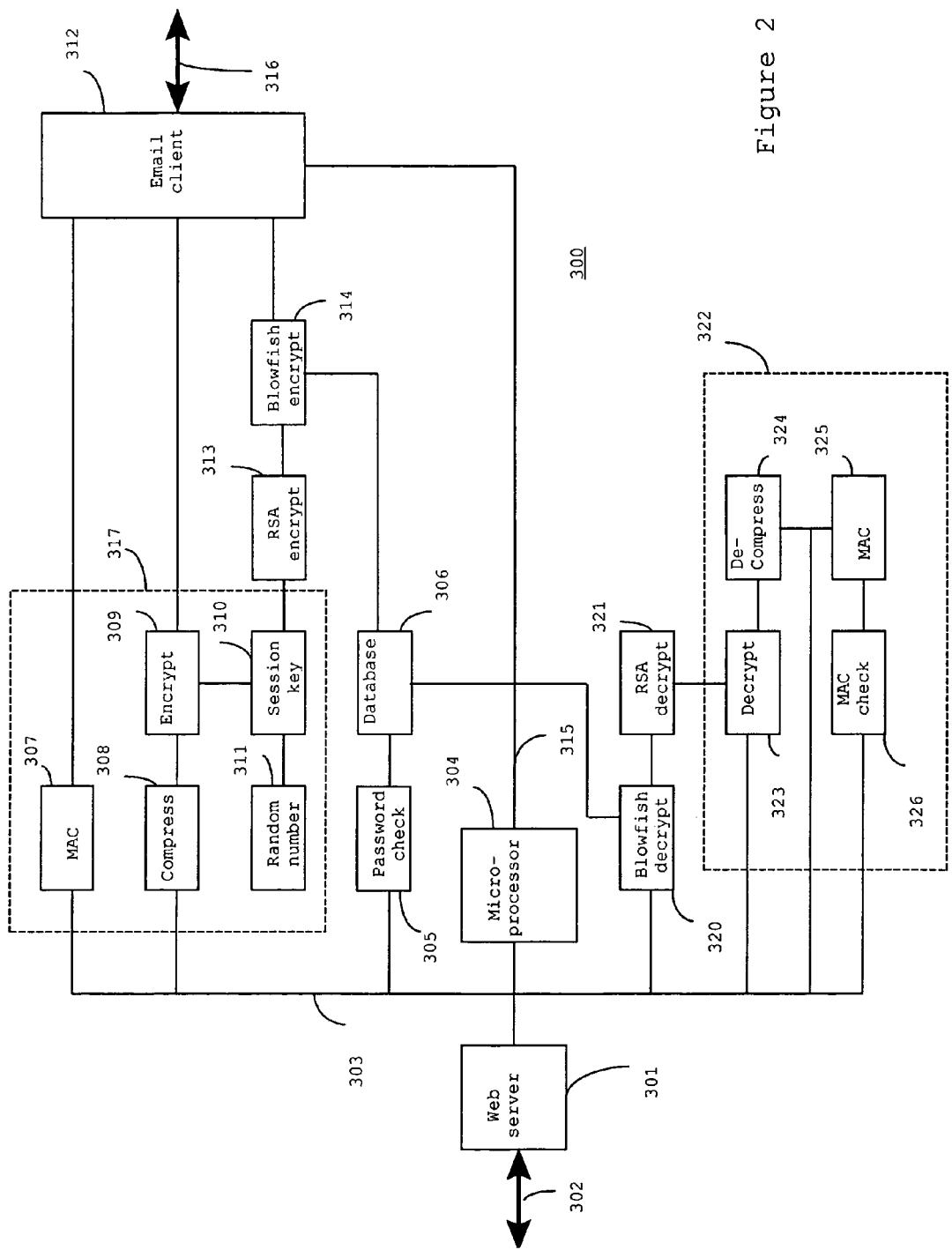
FIG. 2 shows a schematic block diagram of the operating modules of the server used in FIG. 1.

Referring now to FIGS. 1 and 2, these show a system operating one embodiment of a method of encrypting and transferring data between a sender and a receiver using a network. Referring to the drawings, the system operates to encrypt and transfer data between a sender apparatus 100 and a receiver apparatus 200.

In this example, the sender apparatus 100 comprises a computer 101 connected to a keyboard 107, a data source 108 and an external display device 105. The data source can comprise a disc reader of some sort or an interface connection to a data library, the data source storing the data to be transferred to the receiver. The computer 101 has a general access bus 106 connecting to a microprocessor 102, a memory 103, a display interface 104, an input device interface 109, and a web browser 110 for connecting to the Internet via a connection 111.

The display interface 104 is connected to the external display device 105 whilst the input device interface 109 is connected to the keyboard 107 and the data source 108. The memory 103 will typically store the sender's ID and the sender's password although these may be input via the keyboard 107 in response to display prompts on the display device 105.

In this example, the receiver apparatus 200 comprises a mobile phone having an Internet capability via a web browser 210 connecting to the Internet via a connection 211. The details of how such a connection is established is well known in the art and will not be described here. The web browser is connected to a general access bus 206 connecting to a microprocessor 202, a memory 203, a display interface 204, and an input device interface 209. The display interface 204 is connected to an integral display device 205 whilst the input device interface 209 is connected to an integral keyboard 207. The memory 203 will typically store the receiver's ID and the receiver's password although these may be input via the keyboard 207 in response to display prompts on the display device 205. The apparatus 200 further includes an email client 212 for sending and receiving emails via a connection 213 to the Internet.

A server 300 is also connected to the Internet via a connection 302. A detailed block diagram of the structure of the server is shown in FIG. 2. This structure of the server will be explained in combination with a description of the operation of the system of the present invention.

Referring to FIGS. 1 and 2, prior to use of the present system, both the sender and receiver are initially registered with the server 300 and their details are stored in a server database module 306. In this embodiment, the information stored includes at least an ID and password for each sender and receiver.

The sender wishes to transfer data held at the data source 108 to the receiver. In order for the sender to transfer the data, the sender needs to know the ID of the receiver and the web address of the server 300. This information may be stored in the memory 103 of the sender or can be manually input through the keyboard 107 in response to prompts on the display device 105.

As shown in FIG. 2, the server 300 includes a web server 301 connected to the Internet via a connection 302. The web server is connected to an input bus 303 and is controlled by a microprocessor 304. When the sender contacts the web address of the server, a secure link such as an SSL link is established, the details of which are well known to those skilled in the art. The microprocessor 304 does not allow access for the sender to the present system until a password check has been completed by module 305 in conjunction with access to database module 306. The details of such password checks are well known in the art and are therefore not described here.

After completion of the password check, a screen display is sent by the server 300 to the sender. By completing this screen, the sender sends to the server the identity of the receiver ID together with the data to be transferred, which is obtained from the data source 108. These inputs are acted on by the modules towards to upper edge of the figure.

On receipt of the receiver ID and the data to be sent, the server microprocessor 304 forwards the data to a message authentication code (MAC) generator module 307. As is known in the art, such a generator produces a piece of code that is computed by using a part or whole of the data in combination with a cryptographic digest algorithm. In the present case, the known MD hash algorithm is used to generate an MD hash value from the data. The MD hash value is forwarded to an email client 312 connected to the Internet via a link 316 so as to be ready for processing into a part of an email.

The received data is compressed in module 308 before being encrypted by module 309 using a session key obtained from a module 310. As is known in the art, the session key is generated from a random number, provided by a random number generator 311. This session key is specific to this data and the transfer thereof, it therefore becomes a transfer specific encryption key. The encrypted data is consequently forwarded to the email client 312 ready for processing into a part of an email.

The session key from module 310 is also encrypted in module 313 using the public key of a public key/private key encryption technique, for example RSA encryption which is well known in the art. Thereafter, the output from module 313 is further encrypted in module 314 using a blowfish algorithm which incorporates the password of the receiver which is obtained from the database 306. This password is output according to the ID of the receiver forwarded from the microprocessor on bus 315. The encrypted session key is forwarded to the email client 312 ready for processing into a part of an email.

The email client 312 processes the MD hash value, the encrypted data and the encrypted session key in known manner to construct an email which is then sent to the appropriate address of the receiver provided by the microprocessor on bus 315 following access to the database 306. In known manner, the email client allocates a unique label to the email and logs the sending thereof. A confirmation of the sending of the email is also sent to the sender either using the web server 301 or the email client 312.

The email that is sent by the server 300 can be received in the typical manner by the email client 212 of the mobile phone 200. The content of the email is set up to either alert the receiver to a transfer of data using the system of the present invention or will automatically activate the web browser 210 to initiate a communication link to the server 300. In any case, under control of the microprocessor 202, the receiver contacts the web address of the server and a secure link such as an SSL link is established, the details of which are well known to those skilled in the art. The server microprocessor 304 does not allow access to the present system until a password check has been completed by module 305 in conjunction with access to database module 306. The details of such password checks are well known in the art and are therefore not described here.

Only after completion of a successful password check, the encrypted data, the encrypted session key and the MD hash value contained in the email are sent on the secure link to the server 300 via the web server 301. These are acted on by the modules towards to lower edge of the figure.

It will be apparent that if the chosen method of sending and reading email is by web mail then the separate email client 213 is unnecessary.

On receipt thereof, the server microprocessor 304 forwards the encrypted session key to a module 320 which applies a reverse blowfish algorithm in combination with the password of the receiver which is obtained from the database 306 on bus 315 according to the ID of the receiver. The output from module 320 is then further decrypted in module 321 using the private key of the RSA encryption used to send the data. By virtue of these modules, the original session key of module 310 is re-produced.

The received encrypted data that is in compressed form is decrypted in module 323 using the decrypted session key before being decompressed in module 324.

As with module 307, an MD hash value is generated in module 325 from the decrypted and decompressed data and under control of the microprocessor 304, the module 326 conducts a comparison check to validate the newly generated MD hash value against the MD hash value received from the receiver to ensure that they match.

Assuming that the MD hash value is correctly validated in module 326, the decrypted data from module 324 is sent back to the receiver over the secure link.

Figure 3:
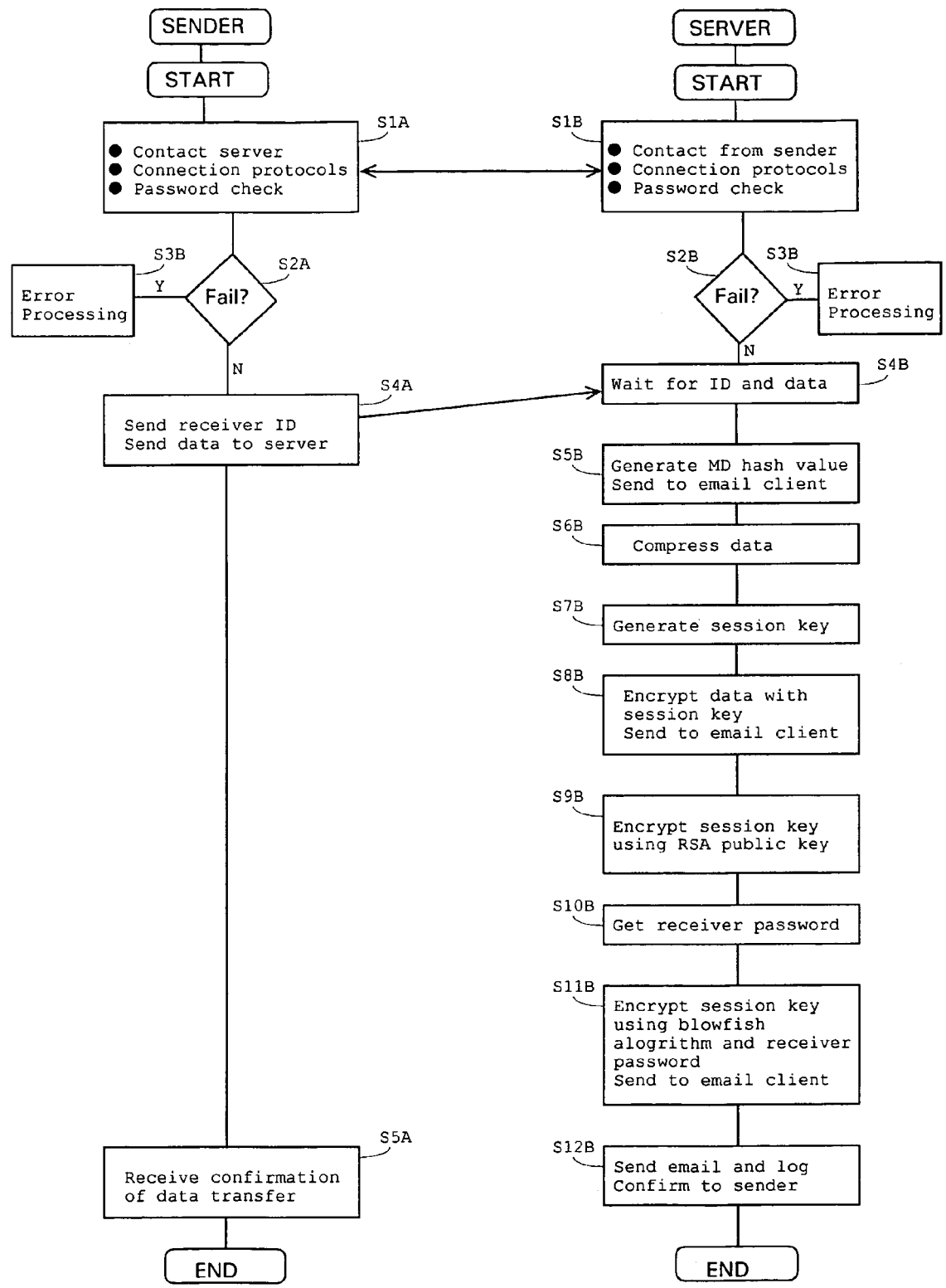
FIG. 3 is a flowchart showing the processes involved in the sender and the server for the present invention to send data from the sender to the server.

FIG. 3 is a flowchart showing the processes involved in the sender and the server for the present invention to send data from the sender to the server.

Initially, the sender wishes to transfer specific data to a specific receiver having a known receiver ID. At step S1A, the sender makes contact with the server in an attempt to establish a secure communication link, for example, an SSL link. Establishing this link involves running through certain connection protocols and the abovementioned password check and can take the form of a display of a web page on the display device 105, the input of appropriate login data on the web page and so forth. As mentioned before, the establishing of such a communication link and the password check are well known to those in the art and will not be described in detail here.

The server, in response to contact from the sender, also tries in step S1B to establish the communication link by running through certain connection protocols and the above mentioned password check. The server will then check in step S2B to see whether a valid link has been made, that is all protocols of communication have been met and that all password checks have been passed. If the link has not been established, or the password check failed, the server goes to error processing step S3B. Such a step may involve further attempts to establish a communication link. Assuming that a valid communication link is established, the process moves to step S4B to wait for receipt of the receiver ID and the data to be transferred. A time out step can be included at this point if required.

In the sender, a check is made in step S2A to also see whether a valid link has been made, that is all protocols of communication have been met and that all password checks have been passed. If the link has not been established, or the password check failed, the sender goes to error processing step S3A. Such a step may involve further attempts to establish a communication link. Assuming that a valid communication link is established, the process moves to step S4A to send the receiver ID and the data to be transferred. A time out step can be included at this point if required.

In one example, a data transfer web page is displayed on the display device 105 which requires the input of the ID of the receiver and an attachment of the data, for example a file located at the data source 108. The completed data transfer page is then sent to the server 300. It will be apparent that the data to be encrypted may be entered directly into the data transfer page.

The content of the data transfer page is received by the server 300 in step S4B after which the process proceeds to step S5B. In this step, the server produces an MD hash value unique to the data and forwards the value to the email client 312, after which the process proceeds to step S6B.

In step S6B, the data is compressed, for example by zipping. Then, in step S7B a random number from the random number generator 311 is obtained to generate a session key which is specific to this data transfer. Thereafter in step S8B, the data is encrypted with this session key and the encrypted data is forwarded to the email client 312.

The process then moves to step S9B in which the session key is encrypted using a public RSA key. Thereafter, the process moves to step S10B to retrieve the password of the receiver after which, in step S11B, the result of step S9B is encrypted with a blowfish algorithm using the password retrieved in step S10B. The resultant encrypted session key is then forwarded to the email client 312.

In the following step S12B, an email is formulated in known manner by the email client 312 into an appropriate format for transfer by HTML, for example by base 64 encoding. It can also have an HTML attachment file, or in-line HTML code for the encrypted data and encrypted session key. The email is then sent and the sending of the email is logged in the usual way, and confirmation sent to the sender, after which the process ends.

It will be apparent that the email contains the MD hash value, the encrypted data, and the encrypted session key, preferably as hidden fields. The email preferably also includes an HTML link to enable the receiver to connect back to the server. This link is configured to automatically submit the hidden fields in the HTML form back to the server. The email subject header is the subject header chosen by the sender, and the email is addressed to the email address of the receiver.

At step S5A the sender receives confirmation of the sending of the email and the process ends.

Figure 4:
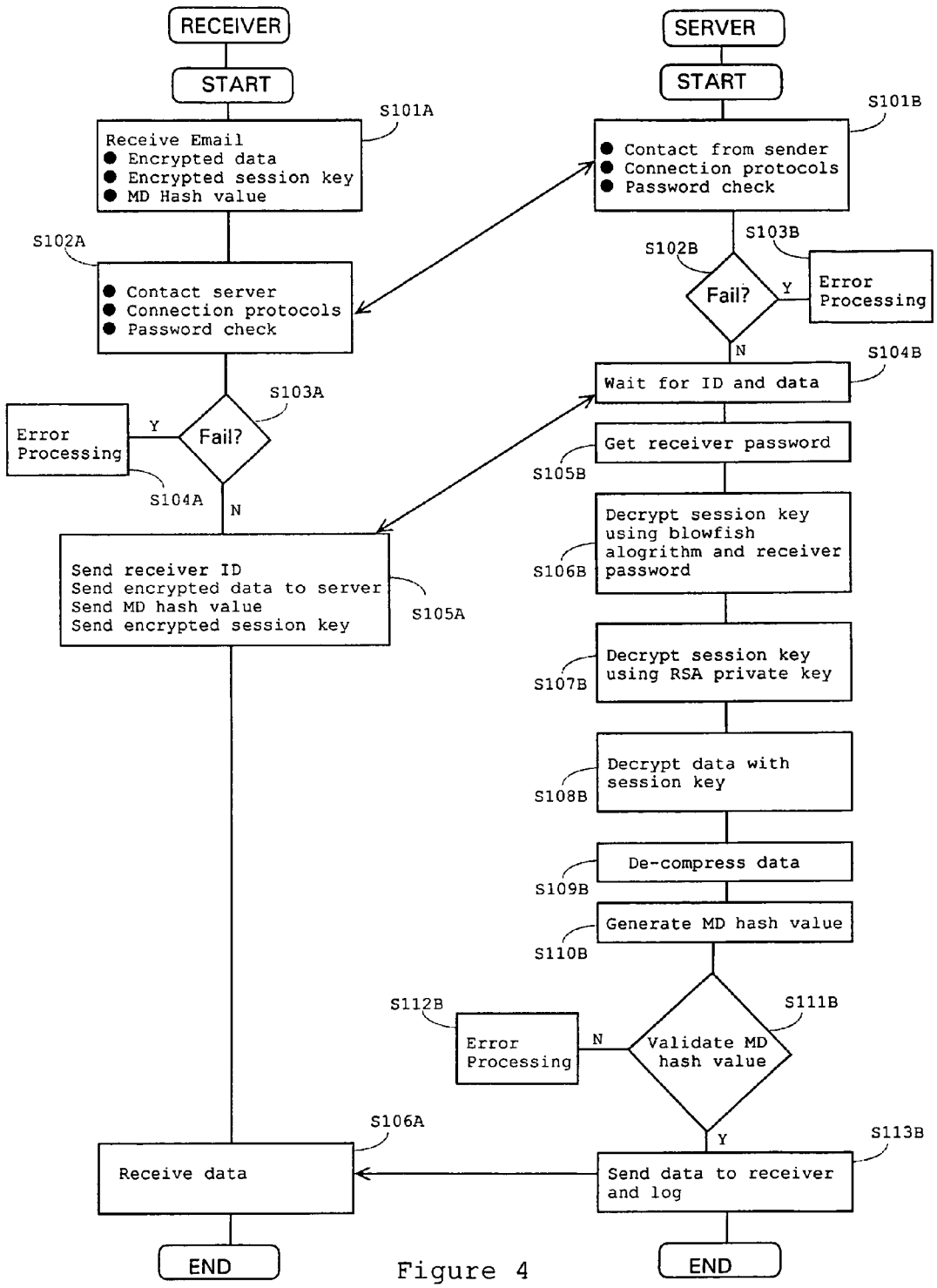
FIG. 4 is a flowchart showing the processes involved in the receiver and the server in response to an email received from the server.

FIG. 4 is a flowchart showing the processes involved in the receiver and the server in response to an email received from the server.

At step S101A, the receiver 200 receives the email from the server which contains, amongst other things, the encrypted data, the encrypted session key, and the MD hash value. The email can be downloaded either using webmail or using the email client 212 over the link 213. At step S102A, the receiver opens the email and makes contact with the server in an attempt to establish a secure communication link, for example, an SSL link. In a similar manner to that described above, establishing this link involves running through certain connection protocols and a password check similar to that discussed above in relation to module 305 and can take the form of a display of a web page on the display device 105, the input of appropriate login data on the web page and so forth. As mentioned before, the establishing of such a communication link and the password check are well known to those in the art and will not be described in detail here.

The server, in response to contact from the receiver, also tries in step S101B to establish the communication link by running through certain connection protocols and the above-mentioned password check. The server then checks in step S102B to see whether a valid link has been made, that is all protocols of communication have been met and that all password checks have been passed. If the link has not been established, or the password check failed, the server goes to error processing step S103B. Such a step may involve further attempts to establish a communication link. Assuming that a valid communication link is established, the process moves to step S104B to wait for receipt of the receiver ID and other information including the encrypted data, the encrypted session key and the MD hash value. A time out step can be included at this point if required.

In the receiver, a check is made in step S103A to also see whether a valid link has been made, that is all protocols of communication have been met and that all password checks have been passed. If the link has not been established, or the password check failed, the sender goes to error processing step S104A. Such a step may involve further attempts to establish a communication link. A time out step can be included at this point if required.

Assuming that a valid communication link is established, the process moves to step S105A to send the receiver ID and the other information mentioned in the preceding paragraph. The latter can be in the form of hidden HTML fields in the email which are submitted to the server 300. It will be apparent that the protocol for the timing and arrangements for sending of ID's, hidden fields, passwords etc can be varied to suit particular situations.

The process in the server then moves to step S105B to retrieve the password of the receiver from module 306 after which, in step S106B, the encrypted session key is decrypted with the blowfish algorithm using the password retrieved in step S105B. The process then moves to an RSA decryption step S107B in which the result of step S106B is decrypted using the private key of the server. This results in the session key being produced.

Thereafter, the process moves to S108B in which the still compressed data is decrypted using the decrypted session key produced from step S107B. After this, the process moves to step S109B to de-compress the data.

In the next step, S110B, the server produces an MD hash value unique to the data from step S109B. Thereafter, in step S111B, the MD hash value from step S110B is checked against the MD hash value received at step S104B. Assuming that the MD hash value is validated, the process proceeds to step S113B and the now unencrypted data of the sender is forwarded to the receiver over the secure link. The sending of this data is logged and the process ends. If the MD hash value can not be validated, the process branches to error processing S112B. This can involve logging of the error and sending of an error message to the receiver to indicate that the data may have been corrupted or compromised.

At step S106A the receiver receives the unencrypted data and the process ends.

In the embodiment of the invention described above, the entire encryption and decryption process is carried out at the server 300. Thus, the sender and receiver do not need any special software to be able to securely send or receive data. In particular, it is unnecessary to have the software, or use the hardware memory and processing resources, to enable RSA encryption and blowfish encryption. In addition, the access to passwords is maintained at the server and does not need to be maintained at the sender. Moreover, since the encryption and decryption takes place on the server, special arrangements necessary for encryption and decryption are not needed by the sender or receiver.

However, the present invention also encompasses the alternative of the functions within box 317 of FIG. 2 being provided in the sender. That is to say, in this modification, the generation of a session key from a random number generator and the compressing of the data and the encryption of the compressed data with that session key are all conducted within the sender. However, a secure link is established with the server as above, but in this case only the generated session key is sent to the server. After the same password check as above, the modules S313 and S314 again generate an encrypted session key which in this case is returned to the sender. The encrypted data, the encrypted session key and the hash value are then provided to a sender email client (not shown) which is also connected to the Internet. This email client constructs an email as above before sending it to the receiver. It can be seen therefore that steps S5B to S8B in FIG. 3 now take place in the sender. This can reduce the processing demands placed on the server.

The receiver receives the email at their email client and can process the email as in FIG. 4.

However, the present invention also encompasses the alternative of the functions within the box 322 of FIG. 2 being provided in the receiver once an email is received from the server. That is to say, in this modification, the decryption of the data, the decompression of the data, the generation of an MD hash value and the validation thereof are all conducted within the receiver. However, a secure link is established with the server as above, but in this case only the encrypted session key is sent to the server. After the same password check as above, the modules S320 and S321 again decrypt the session key which in this case is returned to the receiver. The encrypted data is decrypted using the decrypted session key, decompressed, an MD hash value generated and checked for validity against the MD hash value received in the email. It can be seen therefore that steps S108B to S113 in FIG. 4 now take place in the receiver. This can reduce the processing demands placed on the server.

It will be appreciated that both the modifications mentioned above can be implemented at the same time. Nevertheless, with the present invention, the encryption of the session key, in combination with the password of the receiver, takes place in the server.

It will be appreciated that a group of users can be registered to receive emails when required. For example, the IT department of a firm may register all employees. In this case, in the event that the password check fails in the server, reference to other passwords in that group can be consulted.

In embodiments of the invention requiring special software installed for the sender or the receiver, as is known to those skilled in the art, this may be downloaded from the server during the registration process and then installed.

It will be appreciated that since the correct receiver password is required to decrypt the data in the Blowfish algorithm, and the correct decryption is effectively checked by validating the MD hash value, the password check during the link between the receiver and the server in step 102A can be dispensed with if required.

It will also be appreciated that if decryption is unsuccessful, the server 300 can be arranged to carry out further checks to attempt to obtain the correct password, for example, by looking up old passwords of the receiver and trying each one in turn to decrypt the data. If one of those passwords produces the correct MD5 hash value then the decryption has been successful. However, if none of those passwords work, then the receiver is not the intended receiver or the data has been corrupted during transfer.

If the receiver does not have a password and is not already registered at the server 300, the server can generate a one shot password which it sends to the receiver by whatever secure means are appropriate, e.g. secure post or by a secure link or by secure email, requiring the user to change their password to a secure password to be used thereafter.

With the present invention, the identities of both the sender and the receiver may be verified so that the sender can send data to a receiver who does not have special software installed so that the receiver is confident of the origin of the data. In addition, the encryption and decryption attempts are logged, which may allow a sender to check whether a receiver has received and decrypted the data, and may allow a receiver to check whether data which they are expecting to receive has been dispatched yet.

The sender and receiver apparatus can take many forms, a non exclusive list comprising for example, a computer, a personal digital assistance or other hand held device, a lap top computer, a mobile telephone. The server is preferably a computer, although it may also be an alternative type of computing device.

It will be seen that with the present invention, neither the sender nor the recipient is aware of the password of the other, these being held at the server. Consequently, the level of security required by the sender and receiver is not so high as other known forms of transferring data in a secure manner.

With the present invention, the server maintains receiver specific information, such as a password, which is used by the server in an encryption process. The server obtains this information from a data store, which has a list of receiver IDs and the receiver specific information which is held secret. The receiver specific information may comprise a password, a pass phrase, a PIN number, a hash value or any other information to be used for verification of identity.

The network used with present invention may be the Internet, a local intranet such as an Ethernet network, a telephone network, a radio network, or any other type of network for transferring data. Preferably, when the Internet is used, a secure SSL connection is used between the server and the sender and/or between the server and the receiver.

The sender and receiver may be identified to the server by their email addresses (or other network addresses). However, they may also have user IDs which are unrelated to their network addresses. The server may have a list of network addresses in its database, and/or it may have a list of user IDs, where the network address and/or user IDs are each associated with secret receiver specific information.

In one embodiment of the present invention, the server 300 may include a secret code unique to the server and known only to the server. This secret code may be included into the blowfish encryption and decryption modules. The secret code can be used in the encryption in addition to using the receiver specific information. These two pieces of information may simply be concatenated to be used in the encryption process. The use of the secret key provides an enhanced level of security to the system.

It will be appreciated that the server does not need to retain the session key or any of the data being sent to the receiver. These may be stored in volatile memory on the server, and overwritten when further data and keys are encrypted. This has the advantage that the server does not need to have a large amount of memory available for storing old and possibly redundant data and/or keys.

The carrier medium can comprise a floppy disk, CD ROM, hard disk, or programmable memory device.

While the invention has been described in terms of what are at present its preferred embodiments, it will be apparent to those skilled in the art that various changes can be made to the preferred embodiments without departing from the scope of the invention, which is defined by the claims. The present invention can find application, for example, with mobile phone providers who can distribute monthly statements to mobile phone users in a secure manner, the mobile phone user connecting to the server to retrieve the encrypted statement. In a similar manner, banks can distributes details of incoming payments to their customers who simply can connect to the server as described above to retrieve such details, with the details being distributed in a secure manner.

The invention claimed is:

1. A method of encrypting and transferring data between senders and receivers using a network, the method comprising:

receiving, by a server, an identifier of a receiver from a sender;

generating a transfer specific encryption key specific to a respective transfer of data between said sender and said receiver;

encrypting the data to be transferred using the generated transfer specific encryption key;

retrieving, by the server, information specific to the receiver that is accessed according to the identifier of the receiver received from the sender, and using the retrieved information specific to the receiver to encrypt the generated transfer specific encryption key;

transferring the encrypted data and the encrypted transfer specific encryption key over the network for receipt by the receiver;

receiving, by the server, from the receiver to which the encrypted data and the encrypted transfer specific encryption key has been transferred, the identifier of the receiver and the encrypted transfer specific encryption key;

retrieving, by the server, the information specific to the receiver that is accessed according to the identifier of the receiver received from the receiver, and using the retrieved information specific to the receiver to decrypt the encrypted transfer specific encryption key; and decrypting the encrypted data using the decrypted transfer specific encryption key.

2. A method according to claim 1 further comprising establishing a communication link between the sender and the server.

3. A method according to claim 2 further comprising establishing the communication link between the sender and the server to be a secure link.

4. A method according to claim 2 further comprising establishing the communication link between the sender and server subject to a check by the server of a password of the sender.

5. A method according to claim 1 further comprising establishing a communication link between the receiver and the server.

6. A method according to claim 5 further comprising establishing the communication link between the receiver and the server to be a secure link.

7. A method according to claim 5 further comprising establishing the communication link between the receiver and server subject to a check by the server of a password of the receiver.

8. A method according to claim 1 wherein generating the transfer specific encryption key takes place at the sender and the generated transfer specific encryption key is sent to the server.

9. A method according to claim 1 wherein encrypting the data using the transfer specific encryption key takes place at the sender.

10. A method according to claim 9 wherein the sender receives from the server the encrypted transfer specific encryption key and the sender transfers the encrypted data and the encrypted transfer specific encryption key to the receiver over the network.

11. A method according to claim 1 wherein the receiver receives from the server the decrypted transfer specific encryption key and decrypting the encrypted data using the decrypted transfer specific encryption key takes place at the receiver.

12. A method according to claim 1 wherein generating the transfer specific encryption key takes place at the server.

13. A method according to claim 12 wherein encrypting the data using the transfer specific encryption key takes place at the server.

14. A method according to claim 13 wherein the server transfers the encrypted data and the encrypted transfer specific encryption key to the receiver over the network.

15. A method according to claim 1 wherein decrypting the encrypted data using the decrypted transfer specific encryption key takes place at the server and the server transfers the decrypted data to the receiver.

16. A method according to claim 1 further comprising:
generating a message authentication code (MAC) value for the data prior to encrypting;
transferring the MAC value together with the encrypted data and the encrypted transfer specific encryption key; and
generating a MAC value for the data after decrypting and validating it against the transferred MAC value.

17. A method according to claim 1 wherein encrypting the transfer specific encryption key uses one or more of a public key encryption method, a blowfish algorithm, and secret code of the server.

18. A method of encrypting and transferring data between senders and receivers using a network, the method performed by a server and comprising:
receiving from a sender an identifier of a receiver;
retrieving information specific to the receiver that is accessed according to the identifier of the receiver received from the sender, and using the retrieved information specific to the receiver to encrypt a transfer specific encryption key that is specific to a respective transfer of data between said sender and said receiver and that is used to encrypt the data to be transferred;
receiving from the receiver, to which the encrypted data and the encrypted transfer specific encryption key has been transferred over the network, the identifier of the receiver and the encrypted transfer specific encryption key; and
retrieving the information specific to the receiver that is accessed according to the identifier of the receiver received from the receiver, and using the retrieved information specific to the receiver to decrypt the encrypted transfer specific encryption key.

19. A method according to claim 18 further comprising generating in the server a transfer specific encryption key specific to the transfer.

20. A method according to claim 18 further comprising receiving from the sender a transfer specific encryption key specific to the transfer;
and transferring the encrypted transfer specific encryption key to the sender.

21. A method according to claim 18 further comprising encrypting the data in the server using the transfer specific encryption key.

22. A method according to claim 18 further comprising transferring the encrypted data and the encrypted transfer specific encryption key over the network for receipt by the receiver.

23. A method according to claim 18 further comprising transferring the decrypted transfer specific encryption key to the receiver.

24. A method according to claim 18 further comprising decrypting the encrypted data in the server using the decrypted transfer specific encryption key.

25. A non-transitory computer readable storage medium comprising computer code that when processed by a processor causes said processor to implement a method of encrypting and transferring data between senders and receivers using a network, the medium including:

computer code for receiving from a sender an identifier of a receiver and generating a transfer specific encryption key specific to a respective transfer of data between said sender and said receiver;
computer code for encrypting the data to be transferred using the generated transfer specific encryption key;
computer code for retrieving information specific to the receiver that is accessed according to the identifier of the receiver received from the sender, and using the retrieved information specific to the receiver to encrypt the generated transfer specific encryption key;
computer code for transferring the encrypted data and the encrypted transfer specific encrypting key over the network for receipt by the receiver;
computer code for receiving from the receiver, to whish the encrypted data and the encrypted transfer specific encryption key has been transferred over the network, the identifier of the receiver and the encrypted transfer specific encryption key;
computer code for retrieving the information specific to the receiver that is accessed according to the identifier of the receiver received from the receiver, and using the retrieved information specific to the receiver to decrypt the encrypted transfer specific encryption key; and
computer code for decrypting the encrypted data using the decrypted transfer specific encryption key.

26. A system comprising:
one or more memories storing instructions; and
one or more processors configured to execute the instructions to:
receive an identifier of a receiver from a sender;
generate a transfer specific encryption key specific to a respective transfer of data between said sender and said receiver;
encrypt the data to be transferred using the generated transfer specific encryption key;
retrieve information specific to the receiver that is accessed according to the identifier of the receiver received from the sender, and use the retrieved information specific to the receiver to encrypt the generated transfer specific encryption key;
transfer the encrypted data and the encrypted transfer specific encryption key over the network for receipt by the receiver;
receive, from the receiver to which the encrypted data and the encrypted transfer specific encryption key has been transferred, the identifier of the receiver and the encrypted transfer specific encryption key;
retrieve the information specific to the receiver that is accessed according to the identifier of the receiver received from the receiver, and use the retrieved information specific to the receiver to decrypt the encrypted transfer specific encryption key; and
decrypt the encrypted data using the decrypted transfer specific encryption key.

27. A system comprising:
one or more memories storing instructions; and
one or more processors configured to execute the instructions to:
receive from a sender an identifier of a receiver;
retrieve information specific to the receiver that is accessed according to the identifier of the receiver received from the sender, and use the retrieved information specific to the receiver to encrypt a transfer specific encryption key that is specific to a respective transfer of data between said sender and said receiver and that is used to encrypt the data to be transferred;

receive, from the receiver to which the encrypted data and the encrypted transfer specific encryption key has been transferred over the network, the identifier of the receiver and the encrypted transfer specific encryption key; and retrieve the information specific to the receiver that is accessed according to the identifier of the receiver received from the receiver, and use the retrieved information specific to the receiver to decrypt the encrypted transfer specific encryption key.

* * * * *

UNITED STATES PATENT AND TRADEMARK OFFICE
CERTIFICATE OF CORRECTION

PATENT NO. : 8,478,995 B2
APPLICATION NO. : 11/134951
DATED : July 2, 2013
INVENTOR(S) : Michael H. Alculumbre It is certified that error appears in the above-identified patent and that said Letters Patent is hereby corrected as shown below:

In the Claims:

In claim 25, col. 14, line 15, "whish" should read --which--.

Signed and Sealed this
Twenty-seventh Day of August, 2013

Teresa Stanek Rea
*Acting Director of the United States Patent and Trademark Office*